United States Patent [19]

Raudys

[11] Patent Number: 4,803,757
[45] Date of Patent: Feb. 14, 1989

[54] CASING SIZING MEANS METHOD AND APPARATUS

[75] Inventor: Vytas A. Raudys, Chicago, Ill.

[73] Assignee: Viskase Corporation, Chicago, Ill.

[21] Appl. No.: 430,582

[22] Filed: Sep. 30, 1982

[51] Int. Cl.⁴ ............................................. A22C 11/00
[52] U.S. Cl. ......................................... 17/49; 17/1 F; 17/35
[58] Field of Search ..................... 17/33, 41, 42, 1 R, 17/1 F, 49

[56] References Cited

U.S. PATENT DOCUMENTS

| | | | |
|---|---|---|---|
| 1,940,826 | 12/1933 | Stetson | 226/47 |
| 2,168,693 | 8/1939 | Walter | 17/41 X |
| 3,396,426 | 8/1968 | Ziolko | 17/41 X |
| 3,457,588 | 7/1969 | Myles et al. | 17/41 |
| 3,739,426 | 6/1973 | Schnell | 17/33 |
| 4,007,761 | 2/1977 | Beckman | 138/103 |
| 4,164,057 | 8/1979 | Frey et al. | 17/49 |
| 4,202,075 | 5/1980 | Michel et al. | 17/41 |
| 4,335,488 | 6/1982 | Becker | 17/33 |

Primary Examiner—Willie G. Abercrombie
Attorney, Agent, or Firm—Roger Aceto

[57] ABSTRACT

Sizing means for a food casing including an internal casing sizing means having a convoluted outer periphery which increases the perimeter length of the internal casing sizing means relative to its diameter. An external casing sizing means forces unstretched casing to conform to the convoluted perimeter to stretch the casing to the desired size. Also disclosed is a shirred casing article including the internal sizing means of the present invention as well as a method and apparatus for stretch sizing a food casing employing the internal sizing means of the present invention.

28 Claims, 3 Drawing Sheets

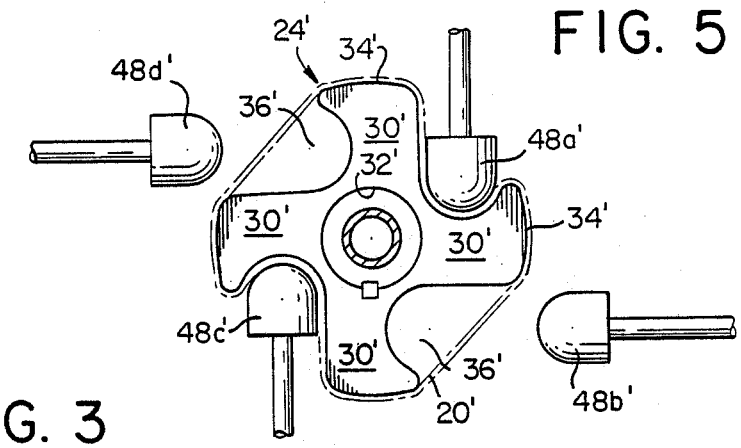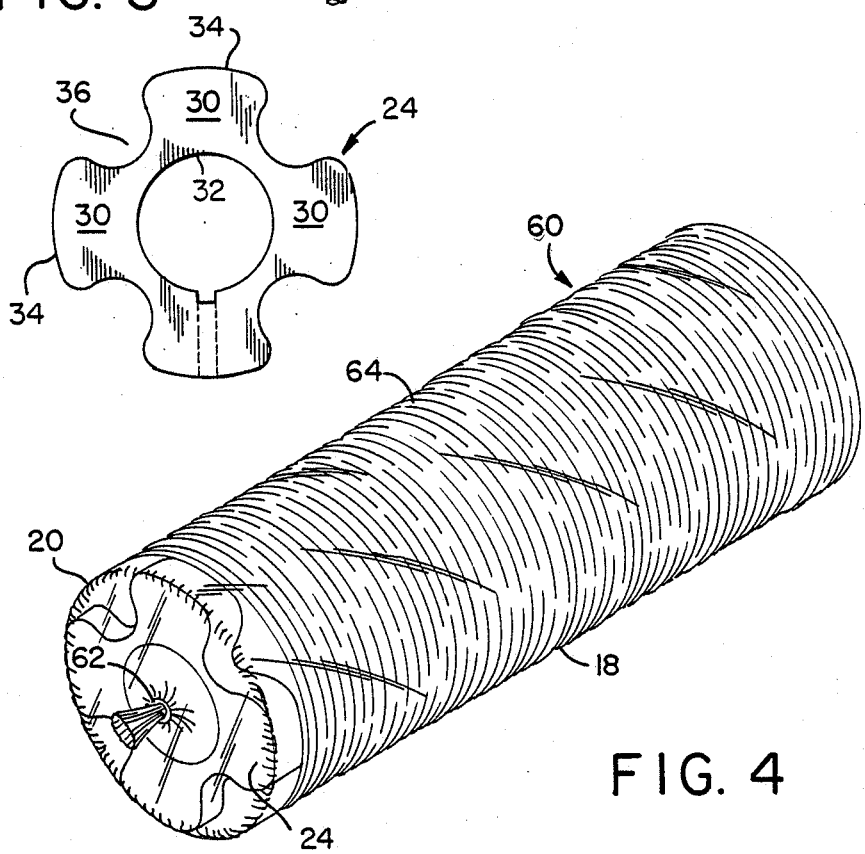

CASING SIZING MEANS METHOD AND APPARATUS

The present invention relates to sizing means for shirred casing articles as used in producing a stuffed casing product, and more particularly, to a combination casing sizing and slacking means which coacts with a stuffing apparatus to provide instantaneous, controlled adjustment of casing stretch, holdback force and slack during the stuffing operation. The invention also relates to a method for stretching casing, a casing article, and to apparatus incorporating the means of the present invention.

Shirred tubular casing articles are well known and are commonly used in making stuffed casing products, including food products, wherein a food emulsion or a comminuted food is stuffed into a continuous length of flexible tubular casing. A shirred casing article including an implanted sizing means is more fully described, for example, in U.S. Pat. No. 4,007,761.

Briefly, a shirred, tubular casing article as described in U.S. Pat. No. 4,007,761 may include a shirred casing length, a portion of unshirred casing and a sizing means implanted within the unshirred portion of the casing. One embodiment more specifically described in U.S. Pat. No. 4,007,761, provides an article which is generally cylindrical in shape with the sizing means being a disc located at one end. With this arrangement the article can be loaded onto a stuffing machine in axial alignment with the stuffing horn of the machine so that the product to be stuffed can be forced under pressure through the stuffing horn and into the casing. As the casing is stuffed, casing deshirrs or "unravels" from the shirred casing length to permit formation of a continuous length of stuffed casing product.

A casing sizing means performs several important functions. For example, it sizes the circumference of the casing as it is being deshirred in order to produce a stuffed casing product having a relatively uniform diameter throughout its length. To this end, the sizing means of U.S. Pat. No. 4,007,761 is a disc which has a circumference or outer perimeter greater than the inner perimeter of the casing so that the outer periphery of the disc is in continuous, stretch-contact with the inner periphery of the casing. Other sizing means, which are adjustable, are disclosed in U.S. Pat. Nos. 3,457,588, 4,202,075 and 4,335,488, among others.

A desired effect is to stretch a given casing to a desired size prior to stuffing as the casing is deshirred over the sizing means. The desired size of the casing is related to the recommended stuffed diameter of the casing. In this respect, it is usually desirable to stretch the casing to a size which is, or which is near to, the final diameter of the stuffed product. The friction, or drag, created as the casing passes over the sizing means may also provide a casing holdback force which determines, in part, the final diameter of the casing stuffed product.

Optimally, a rigid sizing disc as in U.S. Pat. No. 4,007,761, should have its periphery sized to match the inside diameter of a given casing size in order to produce the desired stretch. However, the manufacturing tolerances of casings are such that the flat width, and therefore, the actual internal diameters of casings of the same size may vary from the preferred nominal size. Accordingly, for economic reasons, rigid and unadjustable sizing means, such as discs, which are made to fit a nominal size of casing must also accommodate a casing having an inside diameter which is either larger or smaller than nominal.

This arrangement has given very satisfactory results except in situations where a given casing may be at the high or low limit of its manufacturing tolerances; for example, an oversized casing or conversely, an undersized casing. In the first situation the disc may be too small to impart the desired stretch to the casing and in the second situation the casing may be over-stretched.

The first situation, as set out above, can be compensated for to some extent by the use of a snubbing means as shown, for example, in U.S. Pat. Nos. 4,077,090 and 4,164,057. Such a snubbing means is incorporated into the stuffing apparatus and cooperates with the sizing disc to adjust the holdback force on the casing.

The second situation as set out above is more difficult to deal with and in the extreme case may result in overstuffing to the point of casing rupture. Accordingly, it is customary to utilize a slightly undersized disc, to avoid the possibility of over-stretching the casing.

Adjustable or yielding sizing means can, to some extent, be used to accomodate casings of different sizes or flat widths. However, an adjustable sizing means is usually set, prior to stuffing, to accommodate the nominal size for a casing of a given flat width and is not adjusted further.

In the present invention, the configuration of the outer contour of rigid sizing means has been modified to accomplish the functions of casing and product sizing for a wider range of casing sizes than heretofore possible. The present invention also allows cooperation with means on the stuffing apparatus, to permit a control of the sizing function which is infinitely variable over the full range of adjustment, and to reduce the casing holdback force and to slack the casing in a manner which is faster, more controlled and with less strain on the apparatus, than was heretofore possible.

This is accomplished in a preferred embodiment of the present invention by providing the periphery of a rigid sizing disc with spaced, generally concave, recesses so the outer profile or contour of the disc takes the form of a plurality of arcuate or generally convex lands separated by the recesses. The disc is of a size such that its total outer perimeter including the arc lengths of its lands and recesses, is a length greater than the inner perimeter of the unshirred, unstretched casing with which it is used.

If the size of the disc is such that the lands impart less than the desired maximum stretch or even little or no stretch to the inner perimeter of the unshirred casing, the disc can still function to properly size the casing. This is accomplished by providing the stuffing apparatus with movable members that align with the recesses in the disc. These members can be moved towards the recesses to press against the outside surface of the casing. This stretches the casing into the recesses and over the adjacent lands. In this fashion, the stretch needed to provide the desired inner peripheral length is given to the casing. In order to reduce the casing holdback force, the members are moved in an opposite direction.

SUMMARY OF THE INVENTION

The present invention in its broadest sense can be characterized in one aspect thereof by the provision of sizing means for sizing a tubular food casing or the like by a combination of internally and externally applied stretching forces, the sizing means including attachment means for connecting said sizing means about the outlet of a stuffing apparatus and at least one member extending outwardly from the attachment means, the member terminating in a surface adapted to contact the inner periphery of the casing, the surface having at least one recess for receiving a portion of the casing stretch-deformed into the recess and over the surface.

In a preferred embodiment, the sizing means includes a hub for connecting the sizing means about the discharge of a stuffing apparatus and four outwardly extending members fixed to the hub wherein the outwardly extending end of each member terminates in a sealing surface for engaging the inner periphery of the casing at circumferentially spaced positions, the spaces between the members defining generally concave recesses into which a portion of the casing can be deformed by cooperating, inwardly movable members on the stuffing apparatus.

The present invention also relates to a shirred tubular casing article incorporating the novel sizing means described herein, wherein the article comprises a shirred casing length having an unshirred portion and sizing means confined within the unshirred portion for stretching the inner perimeter of the casing, the inner perimeter of the casing being large enough to accommodate the sizing means therein without being stretched to a desired peripheral length, and the sizing means having its outer perimeter provided with at least one recessed portion, the outer perimeter of the sizing means, including the recessed portion, being of a length at least equal to, and preferably greater than, the desired stetched length of the inner perimeter of unshirred casing.

The method of the present invention concerns stretching a tubular food casing or the like to a desired equivalent diameter (i.e., peripheral length) by mounting a sizing means to a casing stuffing apparatus, the outer perimeter of the sizing means defining one or more circumferentially spaced casing engaging surfaces, each casing engaging surface separated by a recessed portion, aligning a movable casing stretcher means for movement into and out of each of the recessed portions, passing a tubular casing between the sizing means and casing stretcher means, and then moving the casing stretcher means into the recessed portion or portions and against the exterior portion of the casing to stretch-deform the casing into the recessed portion(s) and over the casing engaging surfaces to stretch the casing to the desired peripheral length.

The present invention also concerns a stuffing apparatus including means for receiving the casing to be stuffed and means for delivering a product to be stuffed into the casing, an internal sizing means for attachment to the stuffing apparatus and adapted to contact the inner periphery of the casing at circumferentially spaced positions for stretching the casing, and an external sizing means mounted on the frame including at least one movable member for contacting and stretching the outer perimeter of the casing between adjacent ones of the circumferentially spaced positions contacted by the internal sizing means.

DESCRIPTION OF THE DRAWINGS

FIG. 3 is a front view of the internal casing sizing disc of the present invention;

FIG. 4 is a perspective view showing a shirred tubular casing article employing the internal sizing disc of the present invention; and FIG. 5 is a view similiar to FIG. 3, showing an alternate configuration for the casing sizing disc of the present invention.

DESCRIPTION OF THE PREFERRED EMBODIMENTS

Figure 2:
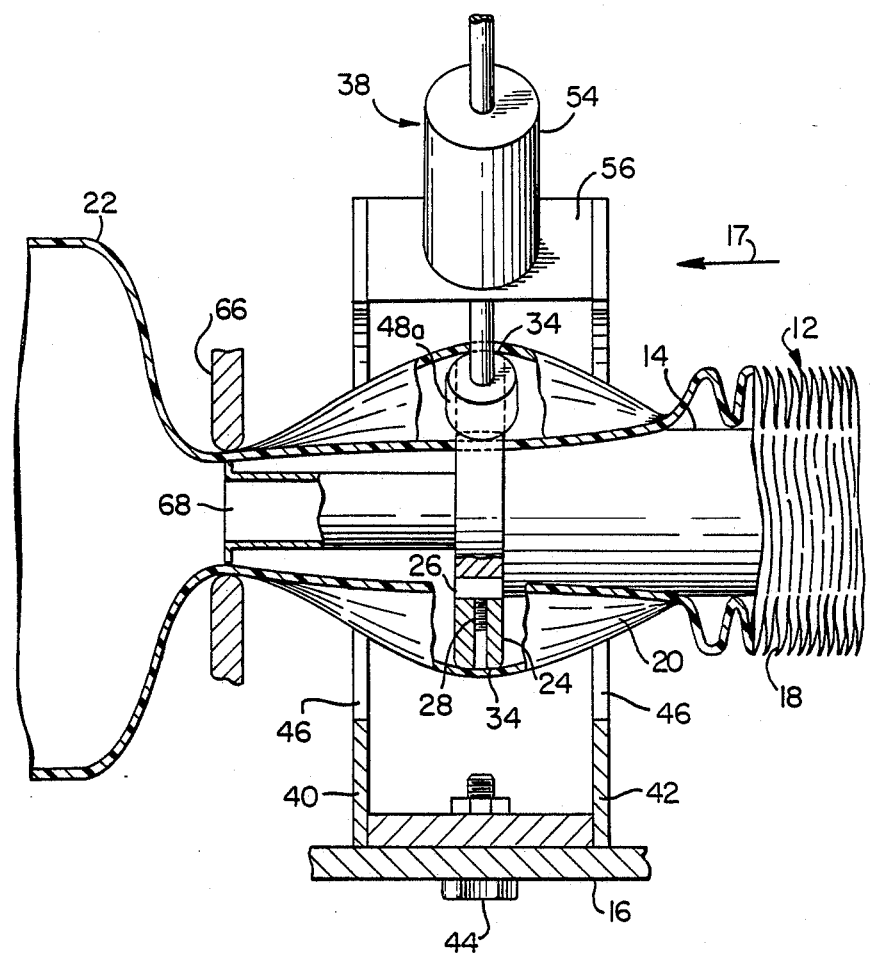
FIG. 2 is a side elevation view of FIG. 1, partly broken away and in section, with portions omitted which are not essential to an understanding of the invention.

Referring to the drawings, FIG. 2 shows a length of casing generally indicated at 12 in place on the stuffing horn assembly 14 of a casing stuffing machine. Only those parts of the casing stuffing machine, including a portion of the bed or frame 16, considered essential to an understanding of this invention are shown in the drawing.

Casing 12 is a conventional shirred, compacted, self-supporting length of casing more commonly known as a "stick". A typical casing might be a size 7½ casing which as a recommended stuffed diameter of 4.54 inches and a flat width of about 14½ inches.

As shown in the drawings, casing 12 has a shirred casing length 18 which undergoes deshirring and stuffing as the casing progresses in the direction shown by the arrow 17. An unshirred portion of casing is shown at 20 and a portion of the ultimate stuffed casing product is shown at 22.

Disposed within the casing is an internal sizing means 24. The sizing means 24 attaches to stuffing horn assembly 14 in a known fashion. For example, a key 26 and a set screw 28 can be used to properly orient and attach the internal sizing means for purposes of the present invention. Other attachment methods such as a bayonet type lock or frangible fingers as disclosed respectively in U.S. Pat. No. 4,007,761 and U.S. Pat. Re. No. 30,265 would be sufficient, provided the internal sizing means can be properly oriented on the stuffing horn assembly for the purposes set out hereinbelow.

Figure 1:
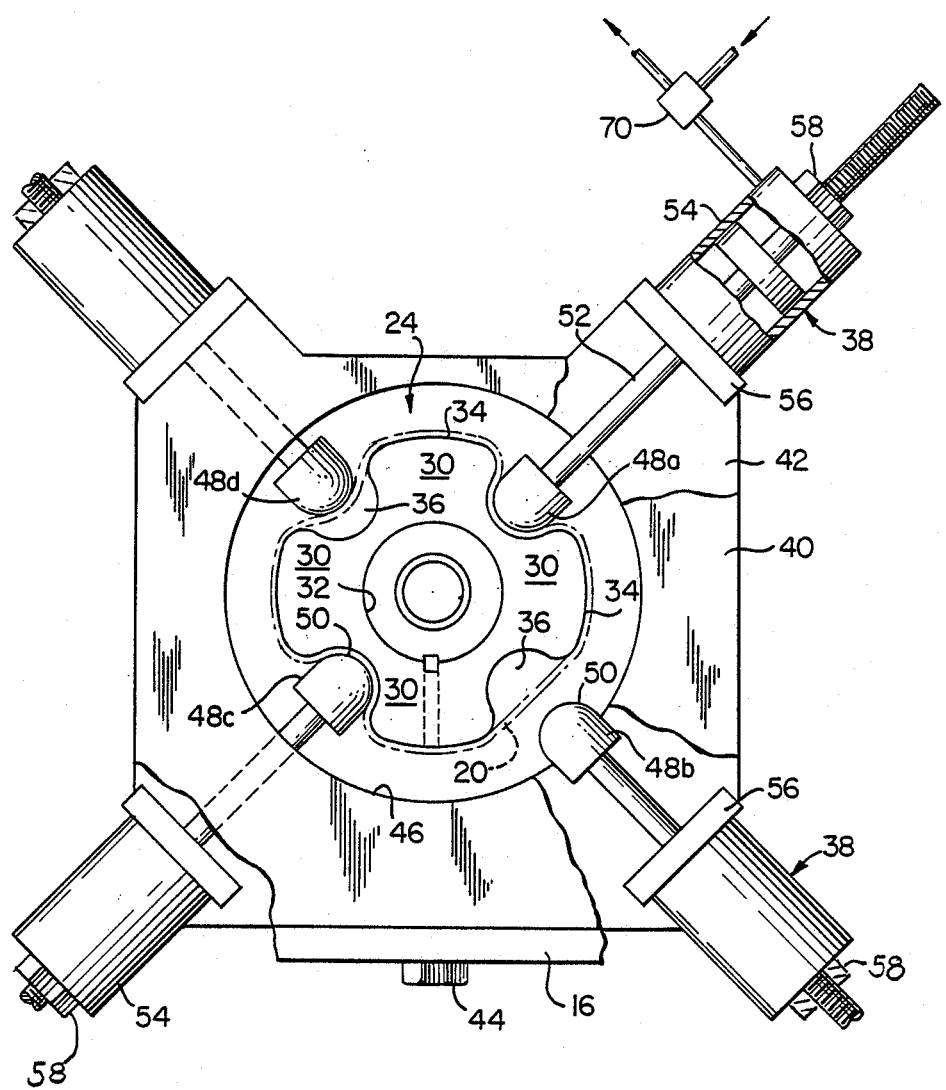
FIG. 1 is a front elevation, partly broken away, showing the sizing means of the present invention in place on a stuffing machine and in cooperative arrangement with other stuffing apparatus elements, and showing the stretched casing in phantom line.

As best seen in FIGS. 1 and 3, internal sizing means 24 of the present invention has four radial arms 30 extending from a hub 32. Each arm terminates in a generally arcuate bearing surface or land 34 for contacting the unshirred casing 20 at circumferentially spaced positions about the casing inner periphery.

Adjacent arms 30 are separated by recessed portions indicated at 36. These recessed portions serve the useful function of convoluting the outer surface of the sizing means to increase the length of its perimeter relative to the diametrical distance across the arms. Consequently, the perimeter of internal sizing means 24, as illustrated, will have the same length as the circumference of a circular disc having a greater diameter, or conversely, it will have a greater perimeter than the circumference of a circular disc of the same relative diameter. The perimeter also will depend upon the number of arms and recessed portions. For a given diameter a disc having more than four arms will have a longer perimeter than a disc with fewer arms.

In order to take advantage of the full convoluted perimeter of internal sizing means 24, the unshirred casing passing over the sizing means must be stretched into one or more of the recessed portions 36. This is accomplished by a cooperating external sizing means, generally indicated at 38, mounted to the frame 16 of the stuffing apparatus adjacent stuffing horn assembly 14. External sizing means 38 includes upright front and rear plates 40, 42 respectively (FIGS. 1 and 2), which are mounted to frame 16 by any convenient means such as bolts 44, and which straddle the internal sizing means 24. Both upright plates have a central opening 46 to accommodate passage of the stuffing horn assembly 14, the internal sizing means 24, and the casing 12 to be stuffed.

As best seen in FIG. 1, the upright plates 40, 42 carry radially movable casing stretchers 48. These casing stretchers each have a generally rounded surface 50 and are, in number, equal to the number of recessed portions 36.

Each casing stretcher 48 is mounted at one end of a radially movable stem 52. Each stem is operably fixed to a suitable drive, such as a pneumatic or hydraulic cylinder 54, for moving each casing stretcher towards or away from its associated recessed portion 36.

Each drive cylinder 54 is fixed to a platform 56 connected to and extending between each corner of the upright front and rear plates 40, 42. The orientation of each drive cylinder 54 is such that it directs the stroke of the casing stretchers 48 radially into and out of an associated recessed portion 36 on the internal sizing means 24. Proper orientation of the internal sizing means with respect to the frame 16 to enable the recessed portions 36 to receive the casing stretchers is provided by key 26 and set screw 28 as set out hereinabove. Stroke length of the casing stretchers 48 is adjusted as needed, simply by rotating an adjustment nut 58 on an end of stem 52 extending through the drive cylinder.

While FIGS. 1-3 show sizing means 24 as having its recessed portions 36 orientated to receive radially movable casing stretchers 48, it should be appreciated that other configurations and orientations for the sizing means can be used to accomplish the casing sizing function in accordance with the present invention. One alternative embodiment is shown in FIG. 5.

As shown in FIG. 5, sizing means 24' has its arms 30' extending outwardly from hub 32'. Each arm terminates in a surface 34' for contacting the inner periphery of a casing 20'. Between each arm is a recessed portion 36' for receiving casing which is stretch-deformed into the recessed portion by an external casing stretcher 48'. Here, however, the external casing stretchers are mounted for movement oriented generally perpendicular to the projection or axis of each arm 30'. This is in contrast to the radial movement of the external casing stretchers 48 of FIGS. 1-3. Accordingly, in the FIG. 5 embodiment, the position and orientation of each recessed portion 36' is shifted on the sizing means, as shown, to enable the recessed portion to receive its associated external casing stretcher 48'.

In a preferred embodiment, internal sizing means 24 is captured or otherwise contained in a prepackaged shirred tubular casing article as is generally shown, for example, in U.S. Pat. No. 4,007,761. In this regard, FIG. 4 shows such an article 60 as including a shirred casing length 18, an unshirred casing portion 20, and the internal sizing means 24 of the present invention captured within the unshirred portion and abutting the shirred casing length. The unshirred portion is gathered over the front of the sizing means and closed by a clip 62 or other suitable closure. Preferably, the article 60 also includes a retaining overwrap 64 which helps to maintain the structural integrity of the article and at least partly covers the article.

In the usual case, it is anticipated that the diametrical distance across the arms 30 of the internal sizing means 24 will be sufficient to permit some minimal contact between the lands or bearing surfaces 34 and the inner periphery of the unshirred casing, so as to keep the sizing means in the upright position as shown in FIG. 4. This contact may, or may not, provide the full stretch necessary to size the unshirred casing to the desired circumference, depending upon the relative sizes of the sizing means 24 and the casing. For example, the length of the inner periphery of the unshirred casing may be large enough to accommodate the sizing means without being stretched to the desired peripheral length. Additional stretch, as desired, would be provided by operation of the external sizing means 38 as further set out hereinbelow.

If the diametrical distance across arms 30 is much smaller than the inner diameter of the unshirred casing, the internal sizing means may not remain upright as shown in FIG. 4 but may move to some other orientation. This may result in the need to manually manipulate the internal sizing means within the unshirred casing in order to reorient the means for attachment to the stuffing horn.

The internal sizing means 24 of the present invention also lends itself to use as a reusable sizing means apart from the packaged article as shown in FIG. 4. In this respect, shirred casings or "sticks" can be put into position on a stuffing horn assembly, in a step separate from the mounting to the horn of the internal sizing means. This arrangement is more conveniently used in cases where the inner dimensions of the unshirred casing permit the unshirred casing to slip over the internal sizing means with relative ease. Otherwise, if the unshirred casing has a tight fit with the internal sizing means, it may be difficult and time consuming for the operator to manually pull and stretch the unshirred casing over the internal sizing means.

Also, it should be appreciated that the means for attaching internal sizing means 24 to the stuffing apparatus may take other forms. For example, reference numeral 14 could represent a stuffing horn, and internal sizing means 24 could be permanently fixed to the stuffing apparatus by welding or otherwise fixing one or more of arm members 30 directly to the stuffing horn. As a further alternative, hub 32 could be an elongated tubular sleeve adapted to slide over, or mount onto, a stuffing horn. If one end of such a tubular sleeve were attached about the discharge opening of the stuffing apparatus, the tubular sleeve itself could function as the stuffing horn. Thus, regardless of the particular attachment means used, the sizing means 24 as described herein is disposed about or is otherwise connected to a structure which forms an outlet, opening, or passage of the stuffing apparatus through which the product to be stuffed is discharged or delivered during the stuffing operation.

If a sleeve as described hereinabove is used, whether it is mounted onto a stuffing horn or whether it also functions as the stuffing horn, the tubular sleeve could be adapted to carry a length of shirred casing as set out in a co-pending U.S. patent application Ser. No. 363,851.

In any event, operation of the internal sizing means 24 of the present invention and the external sizing means 48, will now be described as beginning during the stuffing operation with the conditions as shown in FIG. 2.

In FIG. 2, conventional casing stuffing techniques are being followed, wherein a sealing ring 66 of the stuffing machine serves to hold the stretched casing snugly against the outlet end 68 of the stuffing horn assembly 14. This prevents the emulsion or comminuted food product being stuffed, from back-flowing around the end of the stuffing horn and into the casing towards the right as shown in the Figure.

In a preferred arrangement, the relationship of internal sizing means 24 to the unshirred casing is such that the lands 34 will provide the casing with something less than the desired maximum stretch; that is, the stretch needed to provide the casing with the desired peripheral length.

To provide the unshirred casing with the additional stretch needed to reach the appropriate or desired peripheral length, each drive cylinder 54 is activated by operation of an appropriate control valve 70 (FIG. 1) to move each casing stretcher 48 against the unshirred casing and into its associated recessed portion 36, only one casing stretcher, 48a, being shown in FIG. 2. This causes the unshirred casing to stretch-deform over bearing surfaces 34 and beneath casing stretchers 48, so that the perimeter of the stretched casing assumes generally a convoluted configuration which approaches the shape of the outer perimeter of internal sizing means 24. This stretches the casing from the equivalent of its unstretched or slightly stretched inflated diameter to the equivalent of the desired inflated diameter, wherein the amount of stretch to yield the desired equivalent inflated diameter is determined by the stroke length of the external casing stretchers. Moreover, the force exerted to stretch the casing also acts as a holdback means to provide the desired size to the stuffed product.

FIG. 1 illustrates casing stretchers 48 in various adjusted positions. For example, both casing stretchers 48a and 48c are fully extended into their respective recessed portions and against the exterior of the casing. When fully extending the casing stretchers into their respective recesses, care should be taken not to go so far as to pinch the casing to the point where it tears. While some pinching may be desired to increase friction or hold back, a more preferred arrangement would be not to pinch at all.

Casing stretcher 48b is as shown completely withdrawn from its recessed portion 36 and provides no stretch to the casing, while casing stretcher 48d extends only part way into its recessed portion to provide some intermediate amount of stretch.

It should be appreciated that the positions of the external casing stretchers 48 as shown in FIG. 1 are merely illustrative of the various ranges of movement of casing stretchers 48. While the cylinders 54 and control valves 70 can be arranged to provide strokes of different lengths to each of the casing stretchers, it is preferred to provide simultaneous and equal adjustment to each casing stretcher. Such simultaneous operation can be provided by the appropriate pneumatic or hydrauic control or by mechanically linking each stem 52 to a single drive.

Simultaneous operation is also preferred because during the stuffing operation it is periodically necessary to provide an amount of casing slack, as when the stuffing apparatus is operated to seal the casing around the end of the stuffed product. Whenever slack is desired, all the external casing stretchers 48 should be moved to a fully retracted position, as illustrated by the casing stretcher 48b in FIG. 1, to permit the casing to move freely over the internal sizing means.

It should be appreciated that, if desired, control can be exercised over the slacking operation by allowing some contact between one or more of the casing stretchers and the casing. In this manner, the operator can impart some drag or hold back force to the casing as opposed to freeing the casing completely.

With the arrangement as shown in FIGS. 1 and 2, substantially tension free casing (slack) can be provided instantaneously and with minimum shock to both the casing and the stuffing apparatus simply by retracting all of the external casing stretchers. This is in contrast to known prior art sizing apparatus, wherein casing slack is usually provided by first causing longitudinal or axial movement of the sizing disc and the shirred casing to deshirr and transfer an extra amount of casing to the front of the disc, and then reversing the axial movement to slack the extra casing length in front of the disc. This reciprocating motion, which may extend for a stroke length of five inches, places a strain on both the stuffing apparatus and on the casing as the casing deshirrs over the prior art sizing disc. It also consumes a time interval longer than the retraction of the casing stretchers as set out above.

Thus, it should be appreciated that the arrangement as shown and described herein does lend itself to obtaining several advantages over sizing discs of the prior art, including the ability to properly size a wide range of both shirred and unshirred casing sizes, being infinitely variable over the full range of adjustment and having quick response time when providing casing slack or otherwise adjusting the amount of casing stretch and hold back forces. Still another advantage of the present inventon is that by eliminating the need to reciprocate the apparatus to provide casing slack, the machine length formerly needed for the stroke of this motion can be used to accomodate more shirred casing length. For example, another five inches of shirred casing may translate to an additional 300 to 600 inches of stuffed product.

While having the casing stretching force applied at spaced positions about the outer and the inner periphery of the casing as taught herein may not necessarily be as desirable for all stuffing applications, as a force applied continuously about the inner casing periphery, nevertheless, the present invention does provide solutions to a number of problems heretofore encountered with sizing discs of the prior art.

Moreover, while the invention has been described in terms of stretching the casing to obtain a uniform desired stuffed casing diameter, it should be appreciated that the invention, as claimed, has application where sizing is not critical. For example, in the operation of a machine for making small size sausages such as a polyclip F.C.A./S. machine sold by Niedecker GmbH of Frankfurt, West Germany, stretching the casing is for the purpose of facilitating stuffing at a lower stuffing pressure and size control is not critical. Accordingly, the stuffed products produced with apparatus such as the Niedecker machine may not have a uniform stuffed diameter over the length of the product.

Having described the invention in detail, what is claimed as new is:

1. Sizing means for use in stretching a stretchable tubular casing prior to stuffing, said sizing means including:

(a) attachment means for connecting said sizing means about the outlet of a casing stuffing apparatus;
(b) at least one member extending outwardly from said attachment means, said member being of a size which is receivable within a tubular casing and which permits said sizing means to be oriented within the casing in a plane perpendicular to the longitudinal axis of the casing without peripherally stretching said casing; and,
(c) said member terminating in an outer peripheral surface adapted to contact the casing inner periphery, said surface having at least one recess therein such that the peripheral length of said surface at every cross section normal to the axis of the casing is greater than the unstretched inner periphery of said casing.

2. Sizing means as in claim 1 wherein said member defines a continuous outer peripheral surface having alternate recessed and raised portions, the perimeter of said member including said recessed and raised portions being a length which is at least equal to the desired stretched inner perimeter of said casing.

3. Sizing means as in claim 2 wherein the perimeter of said member including said recessed and raised portions represents a total length greater than the desired stretched inner perimeter of said casing.

4. Sizing means as in claim 1 including a plurality of said members spaced about said attachment means, each of said members terminating in a generally arcuate, casing engaging surface, the spaces between said members defining a plurality of said recesses.

5. Sizing means as in claim 4 wherein said recesses each include a generally concave surface extending between adjacent ones of said arcuate, casing engaging surfaces.

6. Sizing means for use in stretching a tubular food casing or the like to a desired size prior to stuffing, said sizing means comprising:
(a) a hub for attachment about the outlet of a casing stuffing apparatus;
(b) at least two members extending outwardly from said hub, each member terminating in a bearing surface for contacting against the inner perimeter of an unshirred casing at circumferentially spaced positions, said hub and members being of a size which is receivable within said unshirred casing without peripherally stretching said casing;
(c) said members defining recessed portions therebetween, each recessed portion being adapted to receive a portion of said tubular casing which is peripherally stretched into said recessed portions and over the adjacent ones of said bearing surfaces; and
(d) the outer perimeter of said sizing means as defined by said bearing surfaces and recessed portions being greater than the inner perimeter of unstretched casing.

7. Sizing means as in claim 6 wherein said recessed portions are generally concave and merge with adjacent ones of said bearing surfaces to form a fixed continuous outer perimeter radially spaced from said hub.

8. Sizing means as in claim 7 wherein said continuous outer perimeter is greater than the desired inner perimeter of stretched casing.

9. A shirred tubular casing article comprising:
(a) a shirred casing length having an unshirred portion;
(b) sizing means confined within said unshirred portion for peripherally stretching the inner perimeter thereof, the inner perimeter of said unshirred casing being large enough to accommodate said sizing means therein without being peripherally stretched; and,
(c) said sizing means having its outer periphery provided with at least one recessed portion for receiving casing which is peripherally stretched over the outer periphery of said sizing means and into said recessed portion, the outer perimeter of said sizing means including said recessed portion being of a length greater than the unstretched length of the inner perimeter of said unshirred casing.

10. A shirred tubular casing article as in claim 9 wherein said sizing means has at least two lands spaced about its periphery adapted to contact and stretch the inner periphery of unshirred casing.

11. A shirred tubular casing article as in claim 10 wherein said lands are generally arcuate.

12. A casing article as in claim 10 wherein said sizing means includes a central hub for attachment to the stuffing horn assembly of a casing stuffing apparatus, said lands being radially spaced from said hub.

13. A shirred tubular casing article as in claim 10 wherein said lands define spaced recessed portions there between, said recessed portions being adapted to accommodate a portion of said casing peripherally stretch deformed into said recesses portions and over said lands.

14. A shirred tubular casing article as in claim 13 wherein said recessed portions are generally concave and merge with said lands.

15. Casing stuffing apparatus comprising:
(a) a frame including means for receiving a tubular casing to be stuffed and delivery means for delivering a product to be stuffed into said casing;
(b) internal sizing means for attachment to said stuffing apparatus about said delivery means, said internal sizing means being adapted to contact against the inner perimeter of said casing to be stuffed at circumferentially spaced internal positions for peripherally stretching said casing;
(c) external sizing means mounted on said frame including a plurality of inwardly moveable members for contacting the outer perimeter of the casing to be stuffed at positions between the circumferentially spaced internal positions contacted by said internal sizing means; and
(d) selectively operable drive means on said frame associated with each of said inwardly moveable members for independently moving said members towards or away from said internal sizing means during a stuffing operation.

16. Apparatus as in claim 15 wherein said delivery means is a tubular member and said internal sizing means is mounted on said tubular member.

17. Apparatus as in claim 16 including cooperating orienting means on said tubular member and internal sizing means for fixing the orientation of said internal sizing means with respect to said external sizing means.

18. Apparatus as in claim 15 wherein said internal sizing means includes a hub for attachment about said delivery means and a plurality of radially extending members, said members being of a size which is receivable within a tubular casing and which permits said sizing means to be oriented within the casing in a plane perpendicular to the longitudinal axis of the casing without peripherally stretching said casing, said members terminating in a outer peripheral surface having recessed portions such that the periphery length of said surface at every cross section normal to the axis of the casing is greater than the unstretched inner periphery of said casing; and each of said moveable members of said external sizing means being aligned for movement into and out of an associated one of said recessed portions.

19. Apparatus as in claim 18 wherein each of said moveable members of said external sizing means is arranged for radial movement into and out of an associated one of said recessed portions.

20. Apparatus as in claim 18 wherein each of said moveable members is arranged for movement in the plane of said internal sizing means into and out of an associated one of said recessed portion.

21. Apparatus as in claim 15 wherein each of said external casing sizing means moveable members comprises:
   (a) a casing stretcher for contacting the outer perimeter of the casing to be stretched;
   (b) a stem having one end fixed to said casing stretcher; and
   (c) drive means operatively connected to the second end of said stem.

22. Casing stuffing apparatus comprising:
(a) a frame;
(b) a stuffing horn assembly on said frame, said stuffing horn assembly being adapted to receive a shirred length of tubular casing to be stuffed, and an internal casing sizing means on the stuffing horn assembly and extending outwardly therefrom in a plane which lies perpendicular to the longitudinal axis of the stuffing horn assembly for imparting a peripheral outward stretch to the casing through contact at discreet positions about the inner perimeter of the casing;
(c) external casing sizing means mounted on said frame including a plurality of moveable members spaced about the stuffing horn assembly at positions offset from the contact positions of said internal casing means for imparting a peripheral stretch to the casing through contact at discrete positions about the external perimeter of the casing, said moveable members being guided for radial rectilinear movement in a plane, which if extended, includes the plane of said internal sizing means; and
(d) drive means on said frame for moving said moveable members in said plane towards or away from said internal sizing means during a stuffing operation.

23. A method for stretching a tubular food casing or the like to a desired diameter comprising the steps of:
   (a) mounting a sizing means about the discharge of a casing stuffing apparatus, the sizing means being of a size which is receivable within a tubular casing and which permits said sizing means to be oriented within the casing in a plane perpendicular to the longitudinal axis of the casing without peripherally stretching said casing, and having an outer peripheral surface for contacting the inner periphery of the casing and at least one recessed portion therein such that the peripheral length of said surface at every cross section normal to the axis of the casing is greater than the unstretched inner periphery of said casing;
   (b) aligning moveable casing stretcher means for movement into and out of each recessed portion;
   (c) passing a tubular casing over the outer peripheral surface of said sizing means and between said sizing means and said casing stretcher means; and
   (d) stretching the peripheral length of said casing to obtain said desired diameter by moving said casing stretcher means into at least one recessed portion and against the exterior of said casing and thereby peripherally stretching said casing into said recessed portion and over said outer peripheral surface.

24. A method as in claim 23 wherein passing said tubular casing over said sizing means causes at least a partial peripheral stretch of said casing prior to moving said casing stretcher means against the exterior of said casing.

25. A method as in claim 23 including the step of reducing casing peripheral stretching by withdrawing said casing stretcher means at least partly from at least one recessed portion while continuing to pass a portion of said casing between said sizing means and said stretcher means.

26. A method as in claim 23 including a step of simultaneously stuffing said tubular casing with a food product while peripherally stretching said casing.

27. A method as in claim 26 wherein said step (d) moving of said casing stretcher means into said recessed portion during said stuffing occurs wholly within a plane, which if extended, includes the plane of said sizing means.

28. A method as in claim 26 or 27 wherein said sizing means has a plurality of recessed portions and said step (d) moving of said casing stretcher means during said stuffing is into fewer than all of said recessed portions.

* * * * *